(12) United States Patent
Chou et al.

(10) Patent No.: US 6,742,931 B2
(45) Date of Patent: Jun. 1, 2004

(54) ROLLING BALL SEPARATOR STRUCTURE OF A LINEAR DRIVE MEMBER

(75) Inventors: Chau-Chang Chou, Taichung (TW); Binghung Luo, Taichung (TW); Jen-Chuan Yeh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 10/133,279

(22) Filed: Apr. 29, 2002

(65) Prior Publication Data

US 2003/0190098 A1 Oct. 9, 2003

(30) Foreign Application Priority Data

Apr. 20, 2001 (TW) ...................................... 90206254 U

(51) Int. Cl.[7] .............................................. F16C 29/06
(52) U.S. Cl. ...................................... 384/45; 74/424.88
(58) Field of Search ........................ 74/424.71, 424.82, 74/424.88; 384/45

(56) References Cited

U.S. PATENT DOCUMENTS

| | | | | |
|---|---|---|---|---|
| 5,558,448 A | * | 9/1996 | Yabe et al. | .................. 384/470 |
| 6,347,558 B1 | * | 2/2002 | Miyaguchi et al. | ...... 74/424.71 |
| 2001/0008568 A1 | * | 7/2001 | Kasuga et al. | ................. 384/45 |
| 2001/0037699 A1 | * | 11/2001 | Abe et al. | ................. 74/424.88 |

FOREIGN PATENT DOCUMENTS

| DE | 26 27 025 | * 12/1977 |
|---|---|---|
| JP | 2000-355278 | * 12/2000 |

* cited by examiner

Primary Examiner—William C. Joyce
(74) Attorney, Agent, or Firm—Charles E. Baxley

(57) ABSTRACT

A rolling ball separator structure of a linear drive member includes multiple separators mounted between the multiple rolling balls and each having a body and an outer ring structure. Thus, the body may be deformed elastically, thereby preventing the multiple separators from interfering with the return face of the rolling path during the returning process of the rolling balls, and thereby absorbing the gap variation of the uneven force during the returning process of the rolling balls, and the outer ring structure may maintain the relative position of the rolling balls, so that the rolling balls will not collide directly during the returning process.

1 Claim, 4 Drawing Sheets

ROLLING BALL SEPARATOR STRUCTURE OF A LINEAR DRIVE MEMBER

BACKGROUND OF THE INVENTION

1. Field of the Invention

The present invention relates to a rolling ball separator structure of a linear drive member, and more particularly to a rolling ball separator structure of a linear drive member, wherein the body of the separator may be deformed elastically, thereby preventing the multiple separators from interfering with the return face of the rolling path during the returning process of the rolling balls, and thereby absorbing the gap variation of the uneven force during the returning process of the rolling balls.

2. Description of the Related Art

A conventional linear drive member in accordance with the prior art may be a linear slide-way 101 as shown in FIG. 1 or a ball screw 102 as shown in FIG. 2. The conventional linear drive member is provided with multiple separators 12 or separating balls mounted between the rolling balls 11, thereby achieving the effects of convenience, lubrication and reducing noise during the rolling process. The main problem of the multiple separators 12 mounted between the rolling balls 11 is in that the mating size between the multiple separators 12 and the rolling balls 11 cannot fit easily. If the size of the separator 12 is too large, when the rolling ball 22 of the conventional linear drive member moves in the rolling path 13, the rolling ball 22 easily interferes with the return face 131 of the rolling path 13, to produce the ball blockage phenomenon, thereby affecting the normal operation of the rolling ball 11 as shown in FIG. 3. In addition, if the size of the separator 12 is too small, the separator 12 is easily loosened from the rolling ball 11, thereby losing the function of retaining the rolling ball 11, so that the separator 12 is easily detached from the rolling ball 11 as shown in FIG. 4.

When the separating balls are mounted between the rolling balls 11, the ball blockage phenomenon may be avoided. However, the separating balls occupy a large space, thereby reducing the basic load rating of the conventional linear drive member. In addition, the separating balls cannot retain the rolling balls efficiently.

Further, according to the testing results of the IKO company (U.S. Pat. No. 6,149,307) and the NSK company, the noise reduction of the conventional separator is only about 5 to 10 dB, and the noise reduction of the conventional separator will be smaller during operation at the high speed.

SUMMARY OF THE INVENTION

The primary objective of the present invention is to provide a rolling ball separator structure of a linear drive member, wherein each of the multiple separators is formed by a high molecular material, and includes a body and an outer ring structure. The multiple separators are mounted between the multiple rolling balls. Thus, the body may be deformed elastically, thereby preventing the multiple separators from interfering with the return face of the rolling path during the returning process of the rolling balls, and thereby absorbing the gap variation of the uneven force during the returning process of the rolling balls, and the outer ring structure may maintain the relative position of the rolling balls, so that the rolling balls will not collide directly during the returning process. The damping effect of the high molecular material may refrain the vibration produced during the returning process of the rolling balls, thereby reducing the noise. The separator is impregnated with oil, and has a hollow structure to store the oil, so as to provide the lubricating oil to the surface of the rolling ball, thereby achieving a long-term and successive lubricating effect.

Another objective of the present invention is to provide a rolling ball separator structure of a linear drive member, wherein the body has a center formed with a through hole, for storing oil to lubricate the rolling balls. Thus, the separator is impregnated with oil, and has a hollow structure to store the oil, so as to provide the lubricating oil to the surface of the rolling ball, thereby achieving a long-term and successive lubricating effect.

A further objective of the present invention is to provide a rolling ball separator structure of a linear drive member, wherein the body may be deformed elastically to prevent the multiple separators from interfering with the return face of the rolling path during the returning process of the rolling balls, and to absorb the gap variation of the uneven force during the returning process of the rolling balls, thereby saving time, manual work and saving costs of elements.

In accordance with the present invention, there is provided a rolling ball separator structure of a linear drive member, comprising multiple rolling balls, and multiple separators mounted between the multiple rolling balls, each of the multiple separators including a substantially cylindrical body, the body having two sides each formed with a spherical concave structure for receiving the rolling balls at the two sides, wherein:

the body of each of the multiple separators is formed by a high molecular material, the body has an outer periphery formed with a protruding outer ring structure, the outer ring structure has an outer diameter smaller than the diameter of each of the rolling balls, the body may be deformed elastically, thereby preventing the multiple separators from interfering with the return face of the rolling path during the returning process of the rolling balls, and thereby absorbing the gap variation of the uneven force during the returning process of the rolling balls, and the outer ring structure may maintain the relative position of the rolling balls, so that the rolling balls will not collide directly during the returning process.

Further benefits and advantages of the present invention will become apparent after a careful reading of the detailed description with appropriate reference to the accompanying drawings.

DETAILED DESCRIPTION OF THE INVENTION

Figure 1:
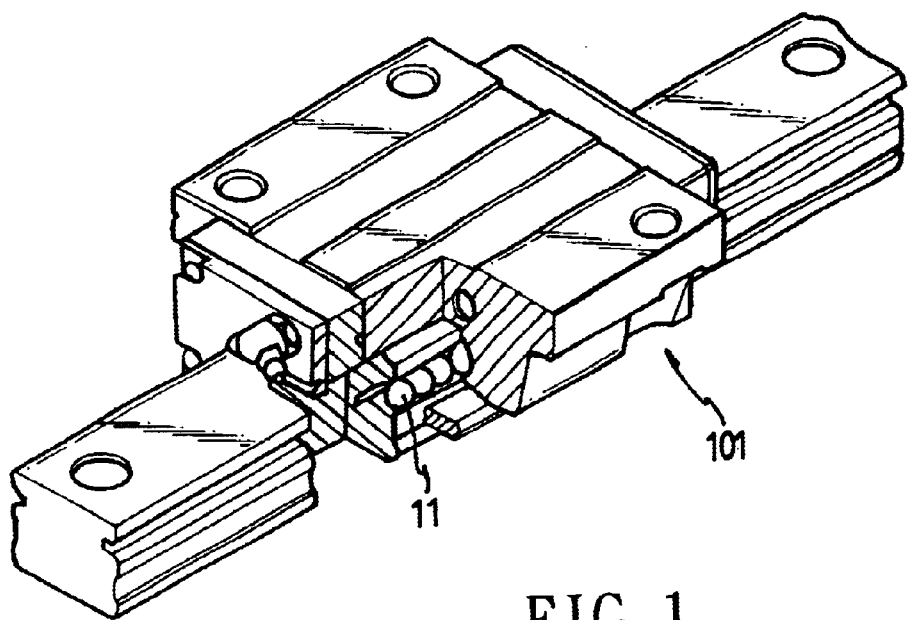
FIG. 1 is a perspective cross-sectional view of a conventional linear slide-way in accordance with the prior art.
Figure 2:
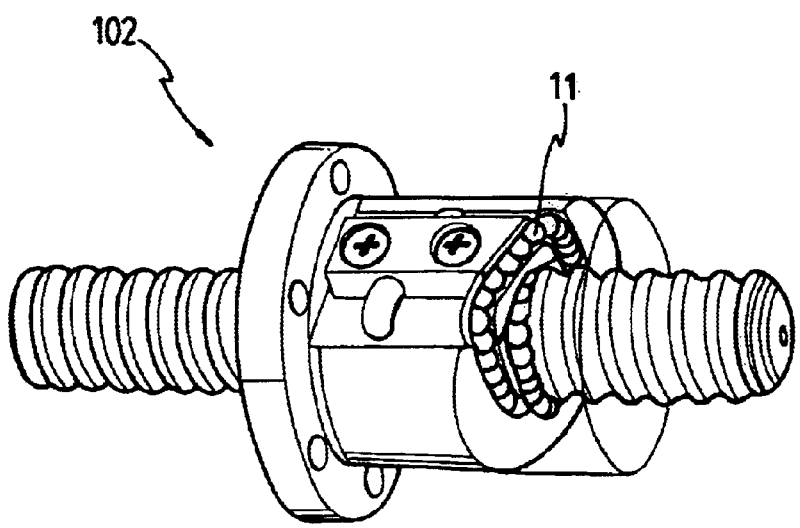
FIG. 2 is a perspective cross-sectional view of a conventional ball screw in accordance with the prior art.
Figure 3:
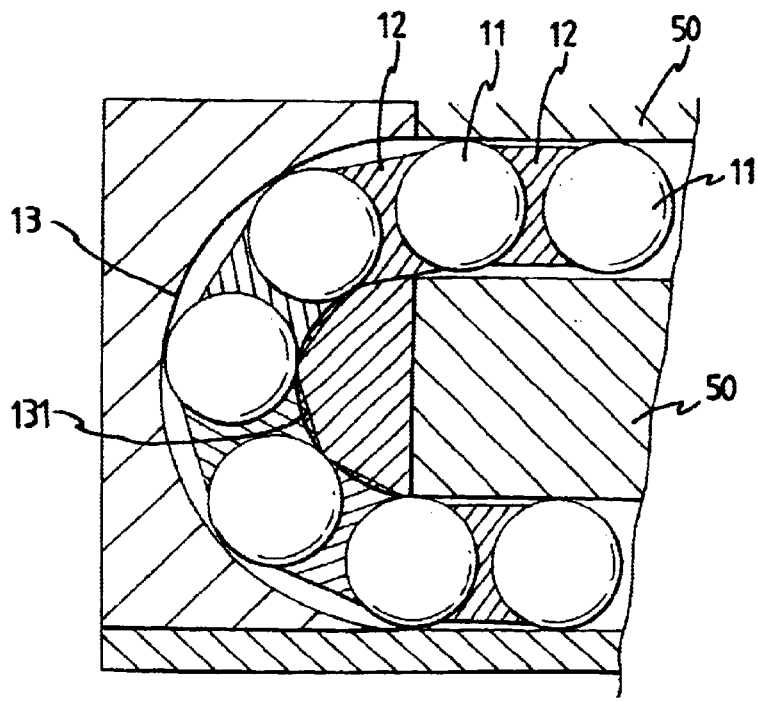
FIG. 3 is a plan cross-sectional assembly view of separators of a rolling ball circulation system in accordance with the prior art.
Figure 4:
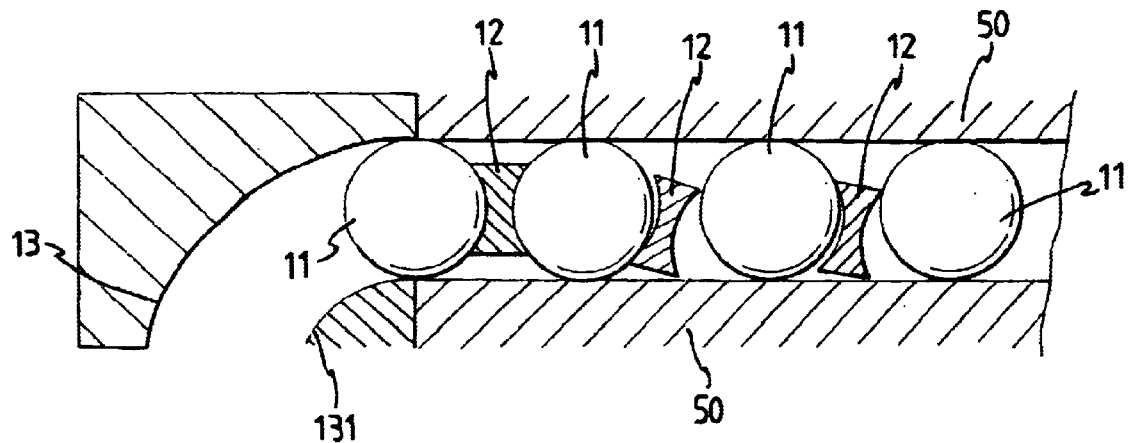
FIG. 4 is a plan cross-sectional assembly view of separators of a rolling ball circulation system in accordance with the prior art.

The rolling ball separator structure of a linear drive member in accordance with a preferred embodiment of the present invention is available for the linear slide-way 101 composed of a slide, a rolling ball circulation system, and a slide-way as shown in FIG. 1 or a ball screw 102 composed of a nut, a rolling ball circulation system, and a screw as shown in FIG. 2.

Figure 5:
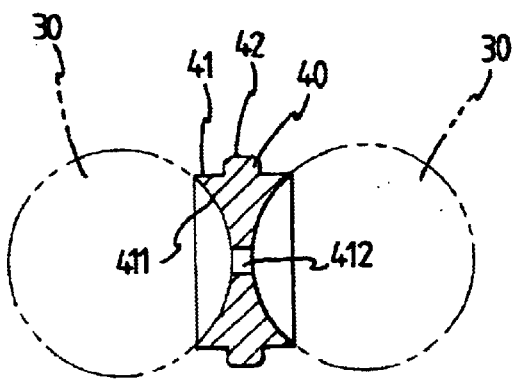
FIG. 5 is a plan cross-sectional view of a rolling ball separator structure of a linear drive member in accordance with a preferred embodiment of the present invention.
Figure 6:
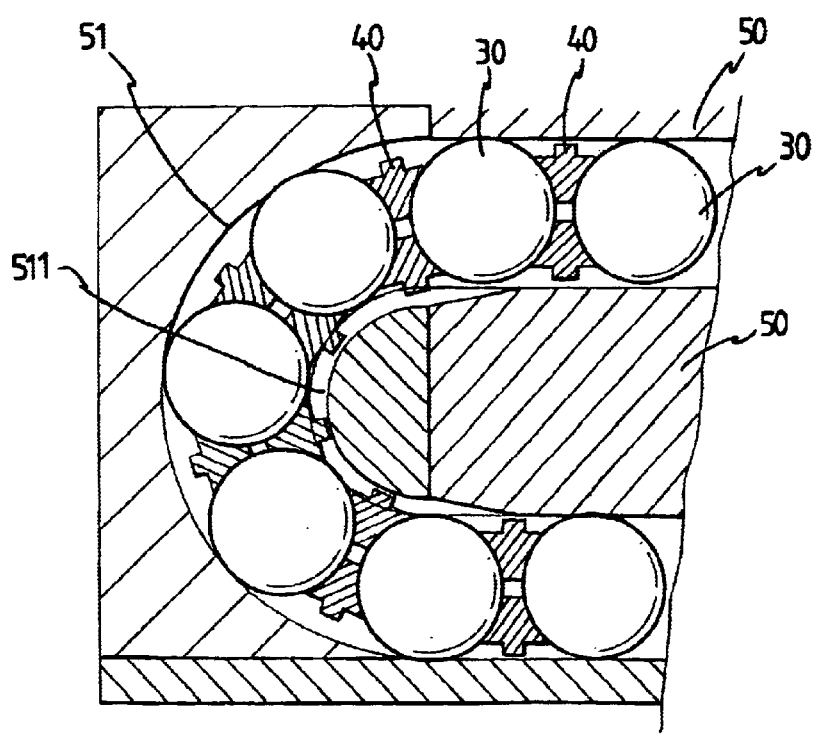
FIG. 6 is a side plan cross-sectional view of the rolling ball separator structure of a linear drive member in accordance with the preferred embodiment of the present invention.

Referring to the drawings and initially to FIGS. 5 and 6, the rolling ball separator structure of a linear drive member in accordance with the preferred embodiment of the present invention is used in the rolling ball circulation system and comprises multiple rolling balls 30, and multiple separators 40 mounted between the multiple rolling balls 30.

Each of the multiple separators 40 includes a substantially cylindrical body 41 that may be formed by a high molecular material, such as an oil-impregnated synthetic resin. The body 41 has two sides each formed with a spherical concave structure 411 for receiving the rolling balls 30 at the two sides. The body 41 has a center formed with a through hole 412. The body 41 has an outer periphery formed with a protruding outer ring structure 42. The outer ring structure 42 has an outer diameter smaller than the diameter of each of the rolling balls 30.

Thus, when the multiple separators 40 are interposed between the multiple rolling balls 30 of the rolling ball circulation system, the body 41 may be deformed elastically, thereby preventing the multiple separators 40 from interfering with the return face 511 of the rolling path 51 during the returning process of the rolling balls 30, and thereby absorbing the gap variation of the uneven force during the returning process of the rolling balls 30. In addition, when the rolling balls 30 are not connected closely, the outer ring structure 42 may maintain the central line of the separator 40 without deflection, thereby preventing from incurring unnecessary shock and impact. Further, the through hole 412 of the body 41 may store oil to lubricate the rolling balls 30, and may enhance the capacity of absorbing the vibration.

The inner structure of the rolling ball circulation in the linear drive member 50 may be understood in FIG. 6. After the gap size of the return face 511 of the rolling path 51 and the rolling balls 30 is properly arranged, the basic load rating due to existence of the separator 40 may be prevented from being reduced, the stiffness may be maintained, the lubricating effect is more efficient, and the lifetime may be lengthened. By design of the outer ring structure 42, the gaps of the rolling balls 30 may be maintained at a smaller varied range. If the size of the separator 40 is too large, the separator 40 will not interfere with the return face 511 of the rolling path 51, to produce the ball blockage phenomenon. In addition, if the size of the separator 40 is too small, the separator 40 will not be detached from the rolling ball 30.

Figure 7:
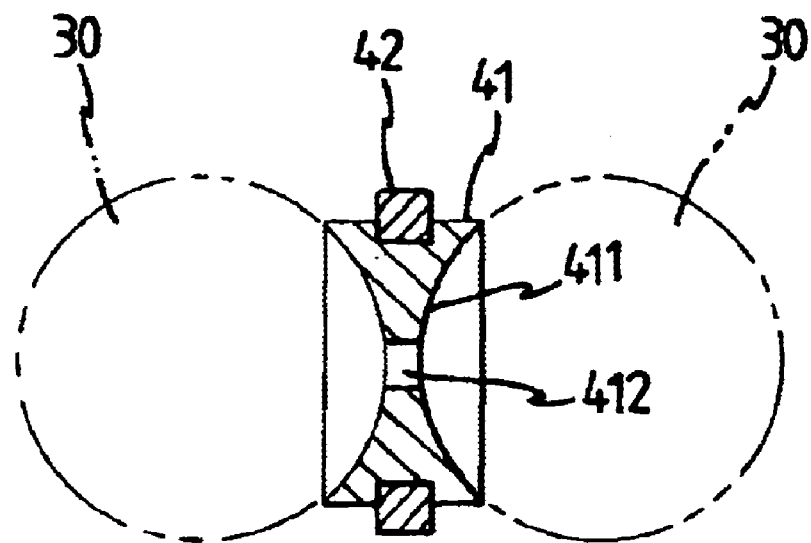
FIG. 7 is a plan cross-sectional view of a rolling ball separator structure of a linear drive member in accordance with another preferred embodiment of the present invention.

It is appreciated that, for increasing the deformation capacity of the body 41 of the separator 40 at the return face 511 of the rolling path 51 and the effect of the body 41 of the separator 40 of absorbing the impact forces of the adjacent rolling balls 30, the body 41 and the outer ring structure 42 of the separator 40 may be respectively made of two oil-impregnated high molecular materials having difference hardness as shown in FIG. 7. The body 41 of the separator 40 may be made of a softer material whose hardness is about 70HA, and the outer ring structure 42 of the separator 40 may be made of a harder material whose hardness is about 90HA. This kind of two-hardness structure may be formed by a two-component injection molding process.

On the other hand, the oil-impregnated high molecular material may be a polyolefinic resin whose oil-impregnated amount is over 50 wt %, and may be formed by the procedure of the polypropylene during the injection molding process, and the residues may be reused.

Accordingly, in the rolling ball separator structure of a linear drive member in accordance with the preferred embodiment of the present invention, each of the multiple separators may be formed by a high molecular material, and the body of each of the multiple separators has an outer periphery formed with a protruding outer ring structure. Thus, the body of each of the multiple separators may be deformed elastically, thereby preventing the multiple separators from interfering with the return face of the rolling path during the returning process of the rolling balls, and thereby absorbing the gap variation of the uneven force during the returning process of the rolling balls. In addition, when the rolling balls are not connected closely, the outer ring structure may maintain the central line of the separator without deflection, thereby preventing from incurring unnecessary shock and impact, so that the rolling balls will not collide directly. Further, the through hole of the body may store oil to lubricate the rolling balls, and may enhance the capacity of absorbing the vibration.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A rolling ball separator structure of a linear drive member, comprising multiple rolling balls, and multiple separators mounted between the multiple rolling balls, each of the multiple separators including a substantially cylindrical body, the body having two sides each formed with a spherical concave structure for receiving the rolling balls at the two sides, wherein:

the body of each of the multiple separators is formed by a high molecular material, the body has an outer periphery formed with a protruding outer ring structure, the outer ring structure has an outer diameter smaller than the diameter of each of the rolling balls, the body being formed of an elastically deformable material, thereby preventing the multiple separators from interfering with the return face of the rolling path during the returning process of the rolling balls, and thereby absorbing the gap variation of the uneven force during the returning process of the rolling balls, and the outer ring structure maintains the relative position of the rolling balls, so that the rolling balls will not collide directly during the returning process;

the body and the outer ring structure of the separator respectively being made of two high molecular materials having difference hardness, wherein the body of the separator being made of a softer material whose hardness is about 70HA, and the outer ring structure of the separator being made of a harder material whose hardness is about 90HA.

* * * * *